(12) United States Patent
Hemingway et al.

(10) Patent No.: US 6,380,486 B1
(45) Date of Patent: Apr. 30, 2002

(54) DIVIDED RACEWAY

(75) Inventors: Jeffrey D. Hemingway, Canton; Thomas R. Russo, Bristol; James L. McClellan, Cromwell, all of CT (US)

(73) Assignee: The Wiremold Company, West Hartford, CT (US)

( * ) Notice: Subject to any disclaimer, the term of this patent is extended or adjusted under 35 U.S.C. 154(b) by 0 days.

(21) Appl. No.: 09/548,140

(22) Filed: Apr. 13, 2000

(51) Int. Cl.[7] .................................................. H02G 3/04
(52) U.S. Cl. ........................ 174/97; 174/70 R; 174/48; 174/68.1
(58) Field of Search ........................... 174/97, 95, 68.1, 174/72 R, 70 R, 48, 49; 52/220.1; 220/3.3

(56) References Cited

U.S. PATENT DOCUMENTS

| | | | | |
|---|---|---|---|---|
| 4,781,255 A | * | 11/1988 | Lock et al. ................. | 174/97 |
| 5,089,667 A | * | 2/1992 | Goussin et al. ............. | 174/101 |
| 5,115,377 A | * | 5/1992 | Dransman .................... | 361/426 |
| 5,134,250 A | * | 7/1992 | Caveney et al. ............ | 174/101 |
| 5,316,244 A | * | 5/1994 | Zetena, Jr. ................... | 248/49 |
| 5,962,809 A | * | 10/1999 | Duvall et al. ................ | 174/37 |

* cited by examiner

*Primary Examiner*—Dean A. Reichard
*Assistant Examiner*—W. David Walkenhorst
(74) *Attorney, Agent, or Firm*—McCormick, Paulding & Huber LLP

(57) ABSTRACT

A raceway separated into multiple wireways by a dividing element is presented, said dividing element being supported by divider clips having an intermediate "U" shape to envelope three sides of the dividing element. Raceway base sections are joined by a raceway coupling particularly adapted to lie along the sidewall of each raceway base section being joined so as not to interfere with the dividing element.

12 Claims, 4 Drawing Sheets

DIVIDED RACEWAY

BACKGROUND OF THE INVENTION

1. Field of the Invention

This invention relates generally to surface mounted electrical raceways of the type having a raceway base adapted to receive a cover held to said raceway base by the opposed raceway base sidewalls, and having divider clips received in the raceway base for supporting dividing elements between the opposed sidewalls of the base. The raceway base elements or components are held in a similar relationship with one another by couplers that do not interfere with the dividing elements.

2. Description of the Prior Art

Raceways are protective conduits for containing varied types of wire and cable, comprising an elongated channel shaped raceway base section, and a raceway cover through which penetrate electrical receptacles, female phone jacks, and the like. The raceway base incorporates a rear wall, two opposing sidewalls, and any number of retaining means by which the raceway cover may snap onto or otherwise attach. Divided electrical raceways are those having multiple wireways physically separated from one another within a single raceway base by a dividing element, and are known in the art. They are widely used, and the need has arisen for more efficient and economical raceway construction that facilitates installation of the dividing elements and the divider clips that support said dividing element, as well as raceway couplings that connect various raceway base sections to one another. The need for raceways incorporating at least two wireways is expected to grow to accommodate various configurations of power, cable and optical carrier lines throughout a building's interior.

Divided raceways typically employ a substantially flat dividing element that parallels the raceway base sidewalls. The dividing element is supported within a raceway base by divider clips. The dividing element installs over the divider clips and is retained by a locking tab mechanism. Divider clips typically require a multi-step fabrication process whereby rolled steel is fed into a 4-slide machine, the steel is formed, multiple sections of the interior portion is stamped, cut, or bent as desired, and the formed steel is sliced into individual components. Prior art divider clips suffer from two deficiencies. First, they require fairly thick steel to support the dividing element, and thus waste material and impose undue wear on the 4-slide machine. Second, they require tools to install within a raceway, thus making installation more labor intensive.

Pairs of raceway base sections, whether divided or not, are joined by couplers that secure raceway sections together in an end to end relationship. Prior art couplers typically span the entire rear wall of a raceway base. They are partly inserted into a first raceway base section, and a second raceway base section is subsequently slid into place adjacent to the first over an extending portion of the coupler. Prior art couplers typically require four screws, one each near the top and bottom of each raceway base section being joined. The primary disadvantage is that these couplers would twist when the screws were tightened, causing the raceway cover to bow. Since they are slid into the open ends of raceway sections, they also require that multiple raceway sections be removed in order to replace a single damaged raceway section. Even during initial installation, the prior art raceway couplings create difficulties in that raceway base sections often do not properly align due to sidewall toe-in. Toe-in results from the roll forming manufacturing process, causing raceway ends that do not precisely match. Prior art couplings often do not readily slide onto both raceway sections due to this toe-in, and must be manually manipulated to fit, further increasing the installation labor.

The present invention overcomes the above shortfalls. First, the divider clip of the present invention may be manufactured without an initial cutout step, and from much thinner metal stock. Second, the present invention employs divider clips that do not include a locking tab mechanism, nor does the disclosed divider clip require that it be installed underneath the dividing element. Thus divided raceways of the present invention are easily reconfigured and upgraded after initial assembly. The coupler of the present invention precludes bowing of the raceway, twisting of the dividing element, and separation of the raceway cover. The coupler of the present invention is easily replaceable within a divided raceway, does not require removal of the dividing element, and allows a single damaged raceway section to be replaced without removing adjacent sections. Finally, the coupler of the present invention overcomes the toe-in match up difficulties since its design tends to cause adjacent sidewalls to align as the coupler is tightened.

The foregoing features are especially advantageous when provided in a two-piece metal raceway system of the type sold by the assignee herein under the WIREMOLD 4000 series steel raceway product line. Such raceway base sections are preferably joined end-to-end to provide a secure structure that is preferably grounded to avoid transient or fault currents that can be induced from the wires and electrical cables carried by the raceway system.

SUMMARY OF THE INVENTION

In accordance with the present invention, several raceway base sections are joined end to end by a unique coupling that is adapted to fit along the sidewall and in the corner between the rear wall and sidewall of each raceway base section to be clamped in place.

In addition to coupling the raceway base sections together, the present invention provides a unique support for dividing elements provided between these opposed sidewalls so that the dividing elements define separate wireways for accommodating discrete types of wiring in a single raceway base.

The dividing element is held in place by spaced divider clips which support the dividing elements, and each clip is provided with end portions that are constructed and arranged to cooperate with the marginal edges of the base sidewalls for this purpose.

Each divider clip preferably includes an intermediate portion of a flattened U-shape. More particularly, this "U" shape is rearwardly open to facilitate the divider clips to be pre-assembled in spaced relationship on the dividing element so that the entire assembly can be conveniently snapped into place by an installer.

DETAILED DESCRIPTION OF THE PREFERRED EMBODIMENT

Figure 1:
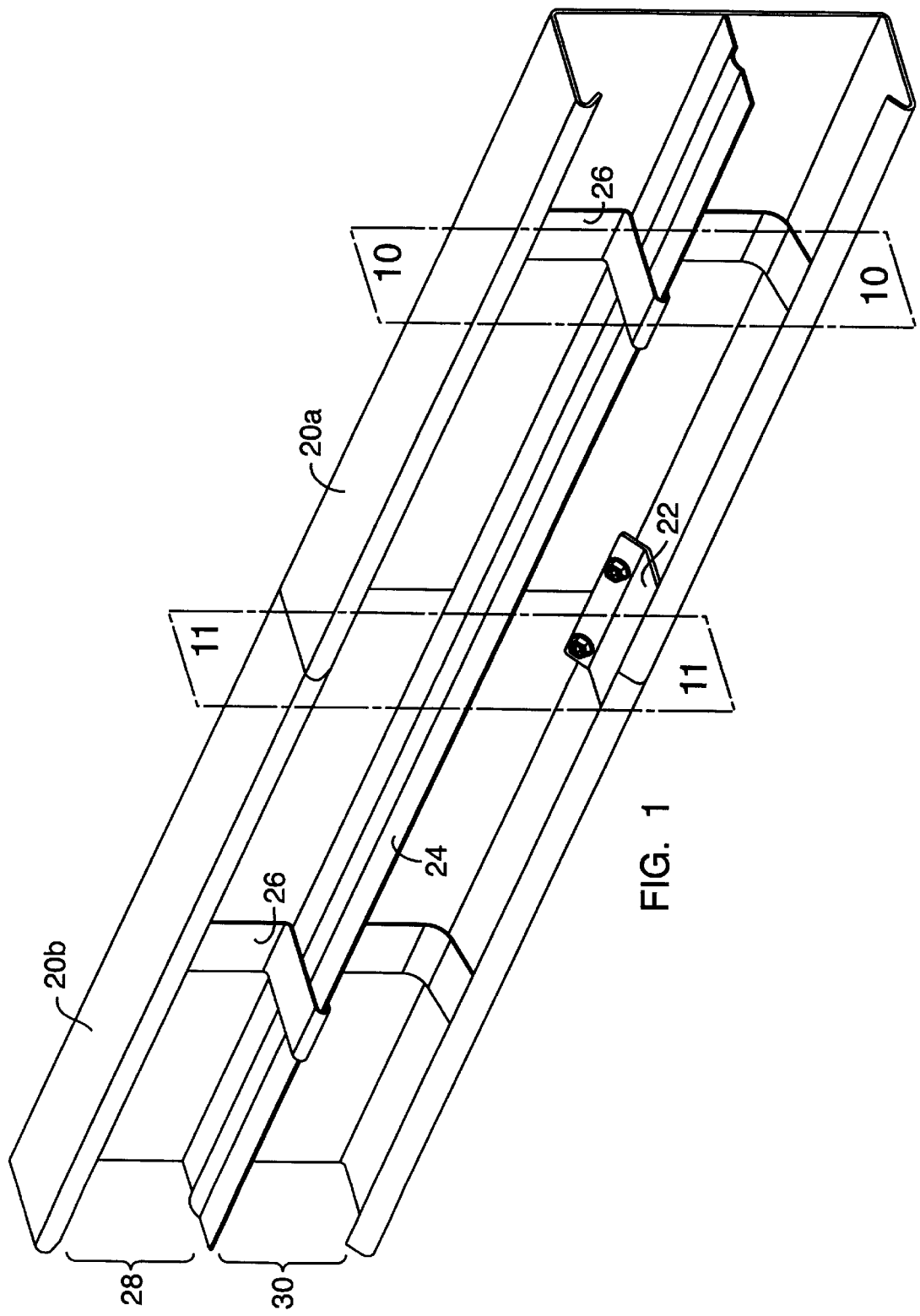
FIG. 1 is a perspective view illustrating two adjacent raceway base sections joined together by a coupling element of the present invention, and provided with a dividing element that is held in place by divider clips constructed in accordance with the present invention.

Turning now to the illustrations, FIG. 1 shows a typical first raceway base section 20a and a second raceway base section 20b joined by a raceway coupling 22. Running the longitudinal length of the raceway interior is a dividing element 24 supported by several divider clips 26. The dividing element 24 separates an upper wireway 28 from a lower wireway 30, each wireway providing a distinct conduit in which electrical, fiber-optic, or similar cable may lie.

Figure 2:
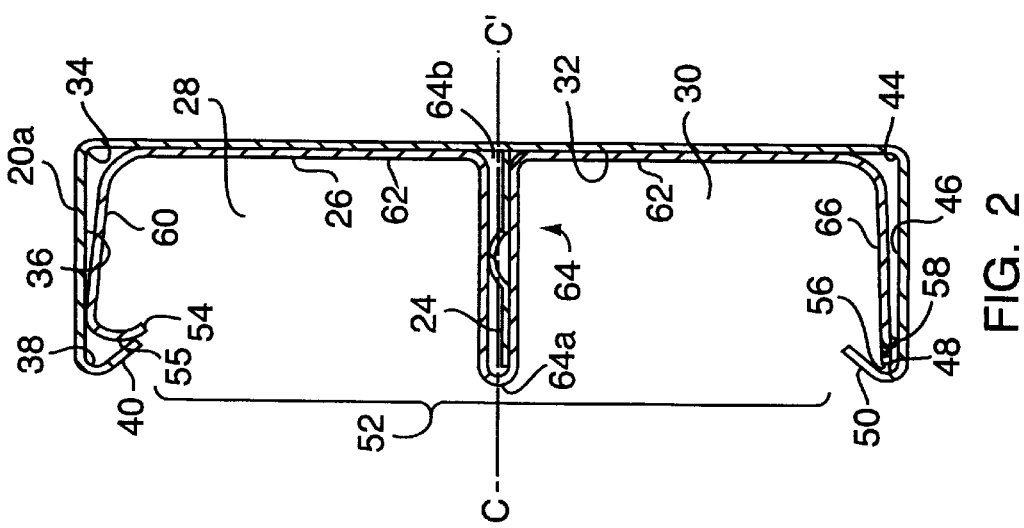
FIG. 2 is a cross sectional view of the raceway base section, a divider clip, and the dividing element, taken through section plane 10 of FIG. 1.

FIG. 2 illustrates a typical raceway base 20 specifically cross sectioned through the plane 10 of FIG. 1 so as to additionally depict a dividing element 24 and a divider clip 26. The raceway base incorporates a rear wall 32 that mounts flush against a surface. Beginning at a rear wall/top sidewall corner 34, a top sidewall 36 extends perpendicular from the rear wall 32, terminating at a marginal edge 38 and an inwardly projecting top lip 40. The raceway base 20 is symmetric about section line C–C', so that the rear wall/bottom sidewall corner 44, the bottom sidewall 46, the marginal edge 48, and the inwardly projecting lower lip 50 are in similar relation as their mirror components previously described. Opposite the rear wall 32 and between the inwardly projecting lips 40 and 50 is a forward opening 52 through which wires and cables may be placed into the raceway base 20. A raceway cover, not shown ultimately closes this forward opening 52.

Figure 3A:
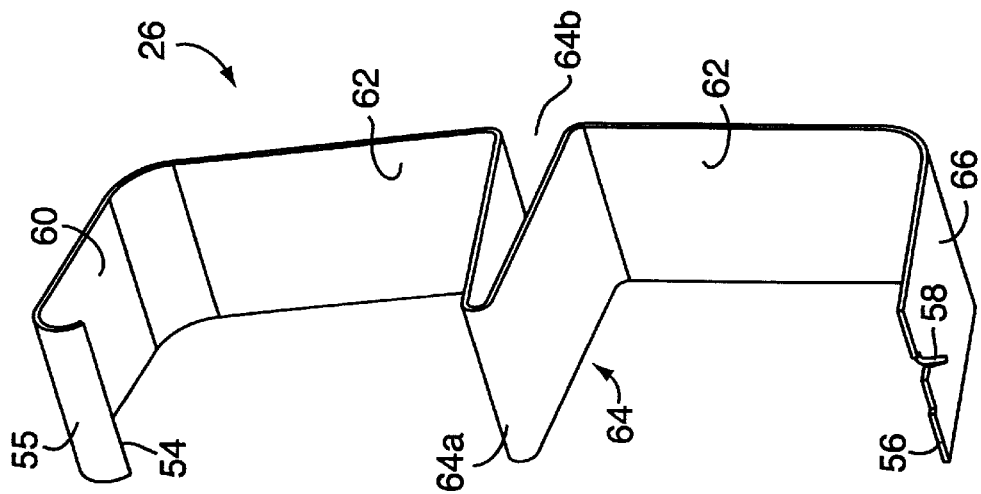
FIG. 3A shows the divider clip of FIG. 3 in its normal uncompressed configuration prior to being deformed resiliently at assembly to assume the FIG. 3 configuration.
Figure 3:
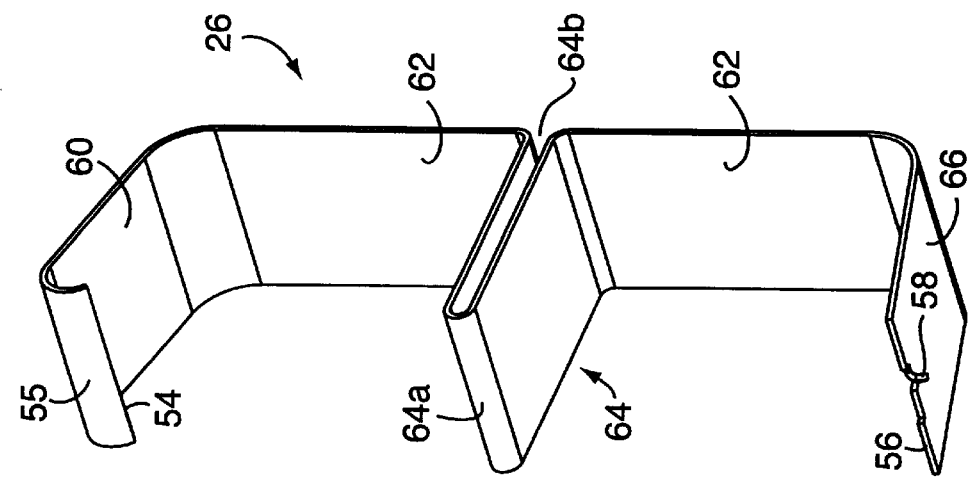
FIG. 3 is a perspective view illustrating the divider clip in isolation, but in the configuration it would assume as assembled (see FIG. 2)

Particular aspects of the divider clip 26 of the present invention are detailed in FIG. 3. The divider clip is formed from a flat metal strip having a top end portion 54 comprising an inwardly curved lip 55 that rests substantially behind the inwardly projecting top lip 40 of the raceway base, and a bottom end portion 56 not similarly curved or bent. Rather, the bottom end portion 56 incorporates a protruding tab 58. This protruding tab positively assures that the divider clip is electrically grounded to the raceway base, and also helps to prevent sliding of the divider clip 26 along the longitudinal direction of the raceway base. In a typical WIREMOLD 4000 series raceway system, the base and cover are usually painted to protect them from oxidation and other environmental damage during shipment, installation, etc. It is important, therefor, that the tab 58 on the divider clip 26 be so constructed and arranged as to penetrate this paint and assure that the electrical ground is achieved between the base and the clip.

The intermediate portion of the divider clip 26 is fashioned to be received within the raceway base 20, said clip having a top section 60 to abut the raceway top sidewall 36 and a rear section 62 to abut the raceway rear wall 32. A bottom section 66 similarly abuts the raceway bottom sidewall 46. Along the rear section 62 is an intermediate U-shaped section 64 that extends substantially perpendicular from the rear section 62 when installed within a raceway. As shown in FIG. 3A the divider clip 26 has a normal configuration such that the legs of the U-shaped section 64 are not parallel as in the assembled FIG. 3 configuration. It is only at assembly that these legs assume a compressed parallel configuration so as to support the divider 24. The metal clip 26 is resiliently deformable to allow the installer to insert the clips (and divider) into the raceway base channel as described below. This U-shaped section 64 is fashioned so that when installed, the closed end of the "U", shown generally at 64a, faces the raceway base forward opening 52 (shown in FIG. 2) and the open end of the "U", shown generally at 64b, faces the raceway base rear wall 32 (shown in FIG. 2). The shape of the "U" is sufficiently deep and narrow so as to retain a dividing element 24 in place by enveloping it around three sides.

The protruding tab 58 additionally allows the divider clip 26 to be short enough that it may be installed by hand rather than requiring tools to manipulate it into place. The bottom end portion 56 is inserted behind the base marginal edge 48, the intermediate "U" portion 64 is placed over a dividing element 24, and the top end portion 60 and the rear section 62 are resiliently deformed by hand pressure to insert the inwardly curved lip 55 behind the inwardly projecting lip 40 of the raceway base 20. While the illustration depicts a divider clip capable of holding one dividing element equidistant from the raceway sidewalls, the present invention and claims encompass divider clips capable of retaining one or more dividing elements in any position between the raceway sidewalls.

Figure 4:
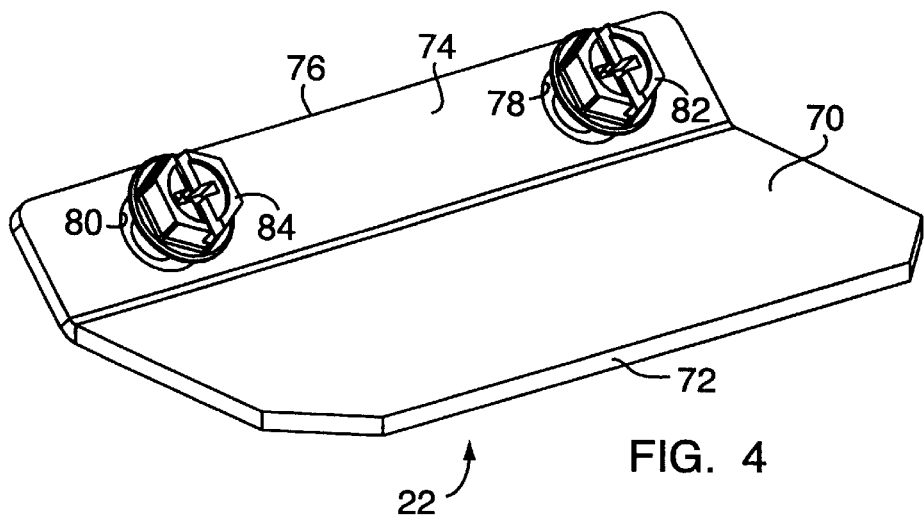
FIG. 4 is a perspective view illustrating the coupling element in isolation.
Figure 5:
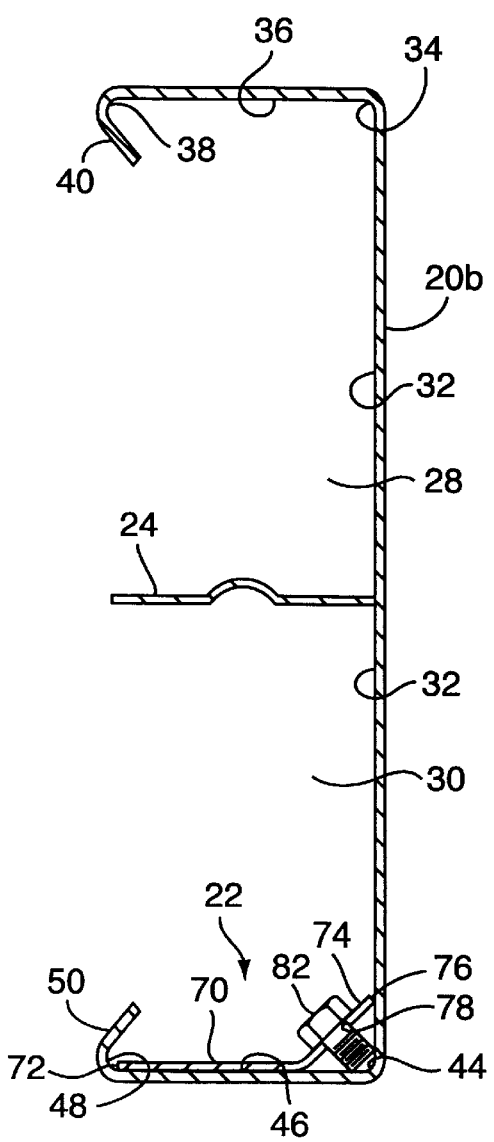
FIG. 5 is a cross sectional view of the raceway base section and coupling, taken through section plane 11 of FIG. 1.
Figure 6:
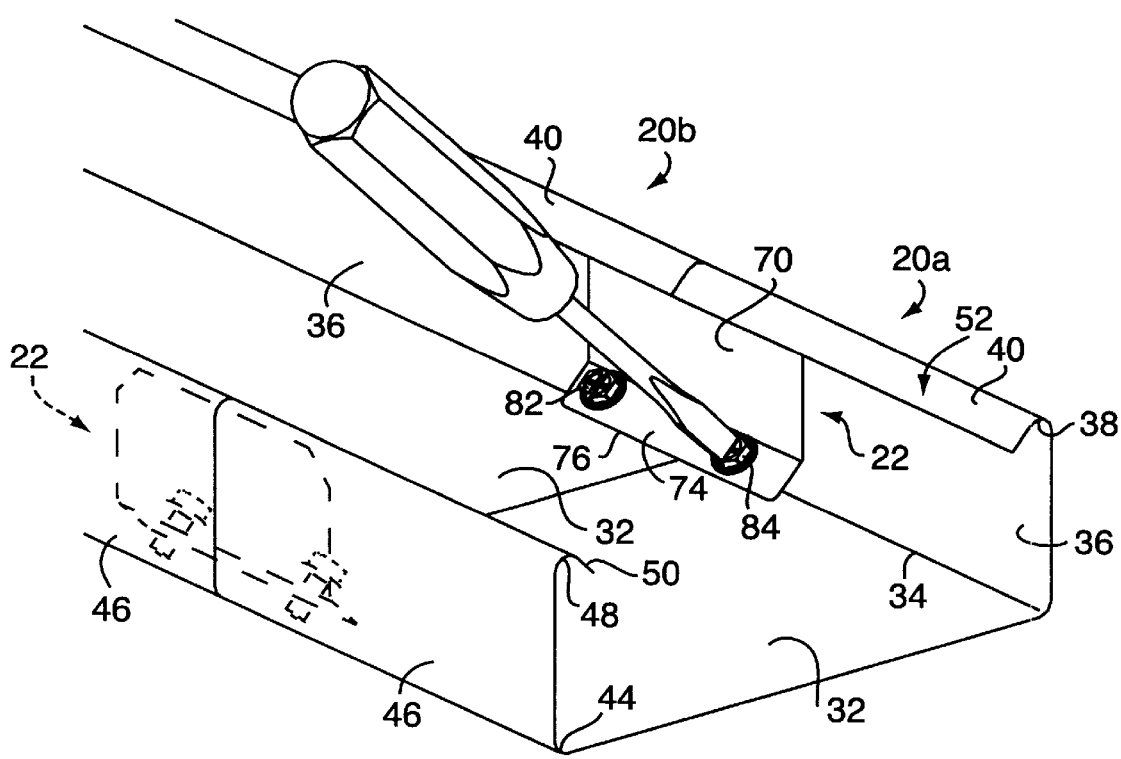
FIG. 6 is a perspective view illustrating two adjacent raceway base sections joined together by two coupling elements of the present invention, one of which is shown in shadow.

FIG. 4 details particular aspects of the raceway coupling 22 of the present invention, which is used to secure two raceway base sections together even if said sections are not divided raceways. Interaction between the coupling 22 and the raceway base 20 is illustrated in FIG. 5, and the following description refers to both FIGS. 4 and 5. Additionally, FIG. 6 illustrates in perspective view two raceway base sections 20a and 20b being joined by two raceway couplings 22, one of which is in shadow, for a better understanding of the invention. For simplicity, the coupling is described herein as being mounted on the raceway base bottom sidewall 46. In fact, the preferred embodiment incorporates a coupling along both the top and bottom sidewalls of the raceway base as depicted in FIG. 6. Thus each pair of adjacent raceway bases are secured with two couplings 22.

The raceway coupling comprises a substantially flat coupling base 70 that lies along the bottom sidewall 46 when installed. The coupling base 70 terminates in a forward edge 72 that is received underneath the inwardly projecting lip 50 of the raceway base. Opposite the forward edge 72 is an angled segment 74 that is inclined approximately 45° from the coupling base and that terminates in a rearward edge 76. Near the lateral ends of the angled segment 74 are first and second openings, 78 and 80 respectively, each capable of receiving a screw. The openings 78 and 80 are situated such that when the coupling is positioned to straddle an abutment between a first and second raceway base section, the first opening faces the first raceway base section and the second opening faces the second raceway base section. A first and second screw, 82 and 84 respectively, are threaded through these respective openings and impact their respective raceway base sections near the corner defined by the rear wall and sidewall. The above configuration minimizes the potential for bowing of the raceway base sections and affords electrical continuity between raceway base sections.

Tightening the screws drives the coupling forward edge 72 firmly against the marginal edges 48 of both raceways, thus securing two raceway base segments in end-to-end relationship. This also aligns the sidewalls and corrects toe-in discrepancies. Blunt end screws are used so that at least a part of the screw's blunted end forcibly impacts the rear wall of the raceway base. The angled segment 74 may include any orientation from approximately 20° to approximately 70° from the coupling base. Angles greater than approximately 70° tend to bow the raceway similar to prior art couplings, while angles less than approximately 20° tend to cause the screws to merely raise the coupling off the sidewall rather than forcibly drive against the rear wall or corner.

As described previously with reference to the tab 58 on clip 26, the screws 82 and 84 are designed to penetrate the painted surface of the base sections and assure that the electrical ground potential of the raceway system is continuous throughout the system, and ground faults or transient voltage conditions are minimized.

While the preferred embodiment and several exemplary modifications have been shown and described, additional various modifications and substitutions will be apparent to those skilled in the art and may be made without departing from the spirit and scope of the present invention. The embodiments described above are hereby stipulated as illustrative rather than exhaustive.

| | |
|---|---|
| 20 | raceway base |
| 20a | first raceway base section |
| 20b | second raceway base section |
| 22 | raceway coupling |
| 24 | dividing element |
| 26 | divider clip |
| | raceway base components |
| 28 | upper wireway |
| 30 | lower wireway |
| 32 | rear wall |
| 34 | rear wall/top sidewall corner |
| 36 | top sidewall |
| 38 | base marginal edge |
| 40 | inwardly projecting lip |
| 44 | rear wall/bottom sidewall corner |
| 46 | bottom sidewall |
| 48 | base marginal edge |
| 50 | inwardly projecting lip |
| 52 | forward opening |
| | divider clip components |
| 54 | top end portion |
| 55 | inwardly curved lip |
| 56 | bottom end portion |
| 58 | protruding tab |
| 60 | top section |
| 62 | rear section |
| 64 | intermediate U-shaped portion |
| 64a | closed end of U-shaped portion |
| 64b | open end of U-shaped portion |
| 66 | bottom section |
| | coupling components |
| 70 | coupling base |
| 72 | forward edge |
| 74 | angled segment |
| 76 | rearward edge |
| 78 | first opening |
| 80 | second opening |
| 82 | first screw |
| 84 | second screw |

What is claimed is:

1. A raceway comprising:

an elongated raceway base section defining at least one channel and having opposed sidewalls, said opposed sidewalls having longitudinally extending marginal edges that are spaced from one another to define an elongated opening therebetween, said base marginal edges defining lips projecting inwardly into said base opening, an elongated dividing element provided between said opposed sidewalls and defining separated wireways for accommodating discreet types of wiring, said dividing element having a generally flat, planar configuration of generally uniform cross section throughout its length, divider clips for supporting said dividing element in said raceway base section, each said divider clip having end portions constructed and arranged to cooperate with said base marginal edges and inwardly projecting lips thereof for securing said divider clip in said raceway base, and each said divider clip further including at least one intermediate portion of flattened U-shape wherein the closed side of the "U" is at the base opening, and wherein the open side of the "U" is adjacent the raceway base section so that a dividing element can be provided in said U-shape opening and held in place by said divider clip.

2. The raceway of claim 1 wherein at least one end portion of each said divider clip defines an inwardly curved lip that fits into at least one of said base marginal edge lips.

3. The raceway of claim 1 wherein at least one end portion of each said divider clip defines a protruding tab forcibly engageable with said raceway base section.

4. The raceway of claim 1 wherein each said divider clip is fabricated from a resiliently deformable material.

5. The raceway according to claim 1 further characterized by coupling means for coupling adjacent raceway base sections to one another, said coupling means comprising:

a base portion adapted to overlie and abut the sidewalls of adjacent raceway base sections, a segment which is angled with respect to said coupling means base portion, said angled segment defining fastener openings, and fasteners received in said openings so that an end of each said fastener forcibly engages a raceway base section.

6. The raceway of claim 5 wherein said angled segment of said coupling means is oriented at an angle between 20° and 70° from said raceway base section sidewall.

7. A coupling means for coupling adjacent raceway base sections to one another, each said coupling means comprising a base portion adapted to overlie and abut the sidewalls of adjacent raceway base sections, and said coupling means further comprising a segment which is angled with respect to said coupling means base portion, said angled segment defining fastener openings, and fasteners received in said openings so that an end of each said fastener forcibly engages a raceway base section.

8. The coupling means of claim 7 wherein said fastener openings and said fasteners are threaded.

9. The coupling means of claim 7 wherein said angled segment of said coupling means is oriented at an angle between 20° and 70° from said raceway base section sidewall.

10. In a raceway including a channel shaped base and at least one dividing element that separates the channel shaped base into discrete wireways, the improvement comprising:

a plurality of divider clips for supporting at least one elongated dividing element within the elongated raceway base, each said divider clip having opposed end portions that engage the raceway base section, and means to envelope longitudinally spaced regions of the dividing element, said dividing element having a generally flat planar cross section and said means to envelope each dividing element region having a shape that conforms generally to said generally flat planar cross section thereof.

11. The raceway of claim 10 wherein each said divider clip has a thickness so as to be resiliently deformable by hand pressure.

12. The raceway of claim 10 wherein each said divider clip includes a protruding tab that positively ensures an electrical connection with said channel shaped base.

* * * * *